United States Patent
Kono et al.

[15] 3,684,093
[45] Aug. 15, 1972

[54] METHOD AND APPARATUS FOR SEPARATING PARTICLES FROM PARTICLE-LADEN FLUID

[72] Inventors: Motomi Kono; Hiroshi Ohtomi, both of Tokyo, Japan

[73] Assignee: Ashizawa Iron Works Co., Ltd., Tokyo, Japan

[22] Filed: June 23, 1970

[21] Appl. No.: 49,039

[30] Foreign Application Priority Data

Aug. 13, 1969    Japan ..................... 44/63975

[52] U.S. Cl. .................. 210/84, 55/339, 55/345, 210/512
[51] Int. Cl. ............................................. B01d 45/12
[58] Field of Search .......................... 210/84, 512; 55/338–340, 345, 261

[56] References Cited

UNITED STATES PATENTS

| | | |
|---|---|---|
| 3,199,269 | 8/1965 | Oehlrich et al. ............... 55/261 |
| 3,481,118 | 12/1969 | Willis et al. ............. 210/512 X |
| 2,735,547 | 2/1956 | Vissac ..................... 210/512 X |
| 3,370,407 | 2/1968 | Morawski ............... 210/512 X |
| 3,488,927 | 1/1970 | Jepsen et al. ............ 55/261 X |

FOREIGN PATENTS OR APPLICATIONS 719,129    10/1965    Canada ....................... 55/339

*Primary Examiner*—John Adee
*Attorney*—Oblon, Fisher & Spivak

[57] ABSTRACT

Particles are separated using an apparatus whereby a primary helical flow of the particle-laden fluid is established so as to create radial centrifugal forces whereby particles contained therein are separated and collected. The primary flow is stopped at a point distant from the point of its origin and a secondary helical flow is established in a direction opposite to the primary flow and along the same axis concentric with the primary flow. The secondary flow is isolated from the primary flow at a point distant from its origin and any remaining particles entrapped in the secondary flow are recovered. In a first embodiment, the particles are recovered by injecting a gas into the isolated secondary flow in a tangential, peripheral and counter-axial direction to said secondary flow so as to force the particles back into the stream of the primary flow. In a second embodiment, the particles are removed from the secondary flow by applying of suction to the secondary flow which discharges into the primary flow.

3 Claims, 6 Drawing Figures

PATENTED AUG 15 1972

INVENTORS
MOTOMI KONO
HIROSHI OHTOMI

BY Oblon, Fisher & Spivak
ATTORNEY

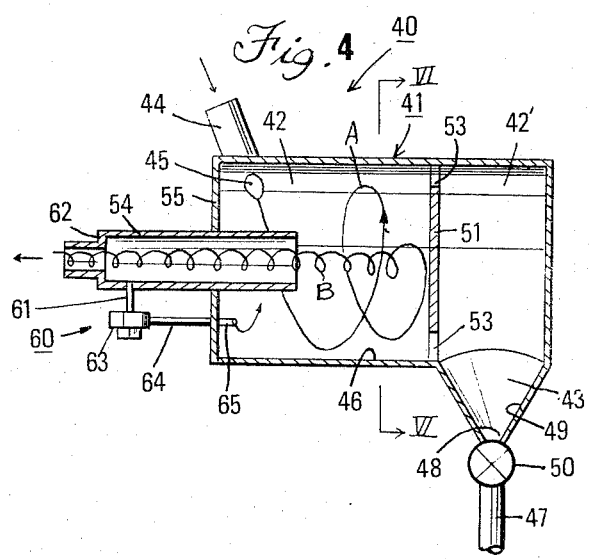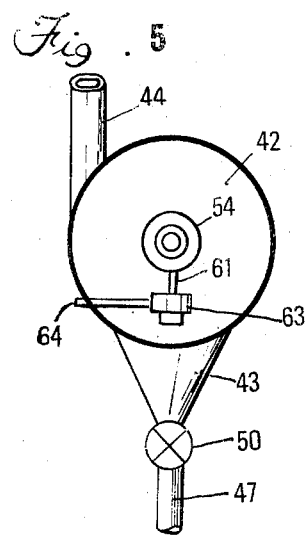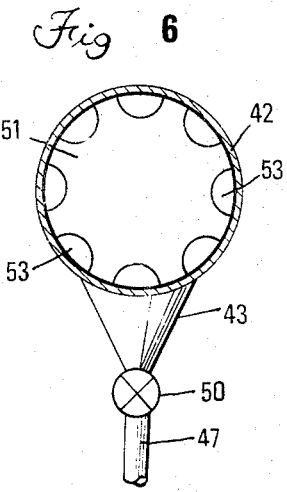

METHOD AND APPARATUS FOR SEPARATING PARTICLES FROM PARTICLE-LADEN FLUID

BACKGROUND OF THE INVENTION

1. Field Of the Invention

This invention relates to a method and to an apparatus for separating particles from particle-laden fluid, and more particularly to a method and an apparatus for establishing a primary helical flow for centrifugally separating particles, reversing the direction of the helical flow at some point distant from the origin of the flow to form a secondary helical flow within and concentric to the primary flow, and separating particles from said secondary flow.

2. Description of Prior Art

Conventional centrifugal separators typically have a separating cylinder in which a particle-laden fluid is helically rotated. A lower conical portion is usually attached to the lower portion of the cylinder. A dust box is provided at the lowermost end of the conical portion into which the separated particles are collected. In this type of conventional structure, a partial vacuum is created at the center of the separating cylinder due to the vortex flow of the fluid. This partial vacuum, however, tends to suck particles from both the conical portion and the dust box back into the exhaust gas. This often results in a significant loss of particles which have heretofore only been difficulty collected. Moreover, due to the partial vacuum in the separator, particles in the dust box tend to float on the intake of atmospheric gas entering the dust box with the result that an even greater portion of particles enters the exhaust gas stream. Another difficulty with the conventional separators is that relatively large particles will frequently fall into the center portion of the vortex flow where they tend to be carried upward due to the strong centrifugal forces.

SUMMARY OF THE INVENTION

Accordingly, it is an object of this invention to provide a method and apparatus for reducing the quantity of particles which enter the exhaust stream.

Another object of this invention is to prevent the loss of particles collected in the lower collecting bin of a centrifugal separator.

A further object of this invention is to provide a technique for compensating for the partial vacuum formed by the vortex flow in the centrifugal separator so that particles can continuously be removed from the system without being sucked back into the centrifugal flow portion or into the exhaust gas.

These and other objects have now herein been attained by a method of separating particles from a particle-laden fluid whereby a primary helical flow of the particle-laden fluid is established along an axis so as to create radial centrifugal forces within the fluid for separating and removing particles therefrom. The primary flow is terminated at a point distant from the point of the origin of the flow so as to establish a secondary helical flow in the reverse direction along the same axis and within the helix of the primary flow. The secondary flow is then isolated from the primary flow and is treated for secondary particle removal. In a first embodiment, this secondary removal is accomplished by injecting a gas into the isolated secondary flow in a tangential, peripheral and counter-axial direction to said secondary flow whereby any particles entrained in the secondary flow are transferred back into the primary flow where they are further separated and collected. In a second embodiment, a suction is applied to the secondary flow so as to remove entrained particles which are then recycled back into the primary flow for further separation and collection.

BRIEF DESCRIPTION OF THE DRAWINGS

FIG. 4 is a sectional view of another embodiment of the apparatus of this invention;

FIG. 5 is a side view of the apparatus shown in FIG. 4; and,

FIG. 6 is a sectional view of the apparatus taken along the line VI—VI in FIG. 4.

DESCRIPTION OF THE PREFERRED EMBODIMENTS

Figure 1:
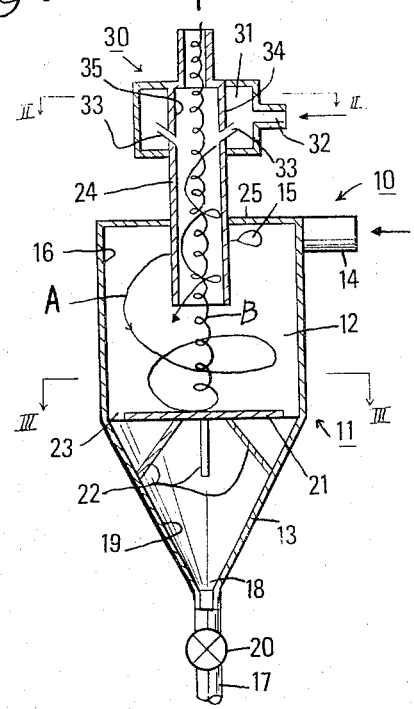
FIG. 1 is an elevational sectional view of an apparatus for separating particles from a particle-laden fluid in accordance with the apparatus of the present invention.
Figure 2:
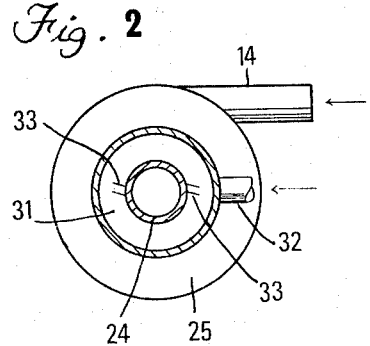
FIG. 2 is a sectional view of the apparatus taken along the line II—II in FIG. 1.
Figure 3:
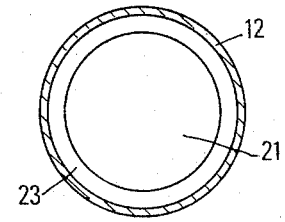
FIG. 3 is a sectional view of the apparatus taken along the line III—III in FIG. 1.

Reference is now made to FIGS. 1, 2, and 3, which show one embodiment of the apparatus constructed in accordance with the present invention. The apparatus 10 for separating particles from a particle-laden fluid comprises a vessel 11 which includes a cylindrical portion 12 and a conical portion 13, an inlet conduit 14 having an opening 15 communicating with the cylindrical portion 12 for supplying a primary flow A of particle-laden fluid tangentially along the cylindrical wall 16 of the vessel 11 at the top of the cylindrical portion 12. An outlet conduit 17 is provided having an opening 18 communicating with the lowermost end of the tapering bottom 19 of the conical portion 13 of the vessel 11 for discharging the particles separated from the fluid. A valve 20 is mounted in the conduit 17. A shut-off plate 21 is provided between the cylindrical portion 12 and the conical portion 13 and is supported by supports 22 on the tapering bottom 19 of the conical portion 13 for stopping the helical axial flow A of the fluid to create a secondary flow B in a counter-axial or upward direction as shown in FIG. 1. The shut-off plate 21 is positioned in the cylindrical portion 12 so as to provide a circular gap 23 between the inner cylindrical wall 16 and the shut-off plate 21. A cylindrical exhaust passage 24 is disposed coaxially with the cylindrical vessel 11 through the upper surface 25 of the vessel 11. This apparatus 10 also comprises a secondary gas supply means 30 which comprises an outer chamber 31 provided around the upper portion of the exhaust passage 24 above the vessel 11 and sealingly attached thereto. An inlet tube 32 is used to feed a pressurized gas to the outer chamber 31 from a blower (not shown). One or more nozzles or injecting tubes 33 are attached through the wall 34 of the exhaust passage 24 in the outer chamber 31 tangentially along the wall 34 and counter-axially to the secondary flow of the fluid through the exhaust passage 24.

In the operation of this apparatus, particle-laden fluid is blown through the inlet conduit 14 into the vessel 11 by a blower (not shown) in a tangential direction along the cylindrical wall 16 of the vessel 11 and along one axis of the vessel 11. This creates a radial centrifugal force in the particle-laden fluid so as to produce a high speed vortex flow designated by A in FIG. 1. The particles are thus centrifugally separated from the fluid flow and they drop or fall along the inner cylindrical wall 16 of the vessel 11. They fall further through the gap 23 between the inner cylindrical wall 16 of the vessel 11 and the shut-off plate 21 into the conical portion 13 of the vessel 11. The axially helical flow A of the particle-laden fluid is essentially stopped at the shut-off plate 21 so that although some of the flow A of the fluid flows through the gap 23 into the conical portion 13 of the vessel 11, most of the primary flow is stopped at the plate 21 with the result that those particles which fall into the conical portion 13 are not circulated therein. In addition, a low pressure area or slight vacuum is produced in the center portion of the axial helical flow A, and this is also stopped at the shut-off plate 21 so that the pressure in the conical portion 13 of the vessel 11 is higher than in the cylindrical portion 12; usually atmospheric pressure. Since the axial helical flow A of the fluid is stopped by the shut-off plate 21, a secondary flow designated by B in FIG. 1 of the fluid is created in a counter-axial direction to the axial helical flow due to the partial vacuum in the center of the primary flow vortex so that the gases are exhausted through the cylindrical exhaust passage 24 which has a smaller diameter than that of the cylindrical portion 12 of vessel 11. Since the axial helical flow B still contains some unseparated particles, a secondary separating means is required. The secondary separation can be obtained by injecting a gas in a tangential, peripheral and counter-axial direction to the helical flow B through the outer chamber 31 and nozzle 33 so that the particles contained in the gas fall against the inner wall surface 35 into the primary axial helical flow A where they are separated as described above.

Thus, since the interior of the conical portion 13 of vessel 11 is maintained at approximately atmospheric pressure by the provision of the shut-off plate 21 between the cylindrical portion 12 and the conical portion 13, it is not necessary to seal valve 17 and the separated particles may be continuously exhausted from the system without having any of the separated particles in the conical portion sucked back into the cylindrical portion 12 due to the vacuum in that portion of the vessel. A very highly efficient separation can therefore be obtained.

Since almost no helical flow occurs within the conical portion 13, the separated particles which fall into this section of the unit remain in the conical section and are not deflected back into the cylindrical portion.

FIGS. 4, 5, and 6 show another embodiment of the apparatus constructed in accordance with the present invention. The apparatus 40 comprises a vessel 11 which includes a cylindrical portion 42, a cylindrical intermediate portion 42' and a conical portion 43 integrally provided underneath the intermediate portion 42'. An inlet conduit 44, having an opening 45 and communicating with the cylindrical portion 42, is provided for supplying a primary flow A of particle-laden fluid tangentially along the cylindrical wall 46. An outlet conduit 47 is provided having an opening 48 communicating with the lowermost end of a tapered bottom 49 for discharging the particles separated from the particle-laden fluid. A valve 50 is mounted in the conduit 47 and a shut-off plate 51 is provided between the cylindrical portion 42 and the intermediate portion 42'. This plate is attached to the inner wall 46 of the cylindrical portion 42 of the vessel 41 and has a plurality of apertures 53 around its periphery as shown in FIG. 6 between the inner cylindrical wall 46 and the shut-off plate 51. The shut-off plate 51 acts to create a secondary flow of the fluid B in a counter-axial direction. A cylindrical exhaust 54 is disposed coaxially with the cylindrical vessel 41 through side surface 55 of the vessel 41. A means 60 is provided for applying a suction to the secondary flow B of the fluid, which means includes an intake conduit 61 which is in communicating relationship with the end portion 62 of the exhaust conduit 54. A blower 63 is provided at the inlet port and a discharge conduit 64 is provided connecting blower 63 with an opening 65 into cylindrical section 42. The conduit opens tangentially to the cylindrical wall 46 of the cylindrical portion 42 of the vessel parallel to the opening 45 of the inlet conduit 44. Particles trapped by the blower and conduit apparatus 60 are reintroduced into the cylindrical portion 42 and they re-enter the helical flow A for further separation.

In the operation of this apparatus, the particle-laden fluid is passed through the inlet conduit 44 into the vessel 41 by a blower (now shown) in a tangential direction along the cylindrical wall 46 around the axis of the vessel 41 so as to create radial centrifugal forces which produce a high speed vortex flow designated by A in FIG. 4. The particles are thus centrifugally separated. The force of the air stream forces the particles through the apparatus 53 into the intermediate portion 42' of the vessel where they fall into the conical portion 43 of the vessel 41. The axial helical flow A of the fluid is substantially stopped at the shut-off plate 51 so that while some of the gases from the primary fluid flow A enters into the intermediate portion 42', most of the flow A is prevented from entering by the shut-off plate 51. The particles entering into the conical portion 43 are therefore not recirculated into the cylindrical portion 42. Furthermore, the shut-off plate 51 permits the conical section 43 to be maintained at atmospheric pressure. The shut-off plate 51 also acts to stop the axial helical flow A so that a secondary flow designated by B is formed in the central vacuum area of cylindrical portion 42 in a counter-axial direction to the axial helical flow A. The secondary flow B is then exhausted through the cylindrical exhaust passage 54 which has a smaller diameter than that of the cylindrical portion 42 of the vessel 41 as described in the first embodiment. Any remaining particles in the helical flow B are almost completely separated by applying a suction through intake conduit 61 so that the particles are captured in conduit 62 and recycled through discharge conduit 64 into cylindrical portion 42 where it re-enters the primary stream A for separation as described above.

Having now described the invention, it will be apparent to one of ordinary skill in the art that many changes and modifications can be made without departing from the spirit or scope of the invention. Accordingly,

WHAT IS CLAIMED AND DESIRED TO BE SECURED BY LETTERS PATENT IS:

1. A method of separating particles from a particle-laden fluid which comprises the steps of:
- establishing a continuous primary helical flow of the particle-laden fluid along an axis so as to create radial centrifugal forces within said fluid whereby particles contained therein are dispersed radially outward thereby;
- collecting said radially dispersed particles;
- stopping said primary flow at a point distant from the point of its origin to establish a secondary helical flow in the reverse direction along the axis of said primary flow and within the helix of said primary flow;
- recovering a portion of any particles entrained in said isolated secondary flow by injecting a gas into said secondary flow in a tangential, peripheral and counter-axial direction to said secondary flow so as to separate any entrained particles therefrom; and
- returning said separated entrained particles directly back into said primary flow where they can be further separated and collected.

2. An apparatus for separating particles from a particle-laden fluid which comprises:
- a vessel having a cylindrical portion and a conical portion connecting with one end of said cylindrical portion;
- an inlet conduit having an opening communicating with said cylindrical portion for introducing a flow of particle-laden fluid tangentially along the cylindrical wall of said vessel at one end, so as to establish a primary helical flow of the particle-laden fluid along the axis of said cylindrical portion;
- an outlet conduit having an opening communicating with the tapered end of the conical portion of said vessel for discharging the particles separated from the fluid;
- means for stopping the helical primary flow of fluid being positioned at some point distant from the point of origin of said primary flow so as to create a secondary flow of the fluid in a counter-axial direction and defining an annular opening at said distant point substantially coaxial with said primary flow;
- a cylindrical passage coaxially disposed with said cylindrical vessel being smaller in diameter than said cylindrical vessel for isolating the secondary flow from said primary flow; and
- means for removing at least a portion of any entrained particles in said secondary flow and for transferring said particles directly into said primary flow for further separation and collection comprising a secondary gas supply means being mounted tangentially to said secondary flow cylindrical passage and angularly inclined in the direction of said fluid stop means relative to the axis.

3. The apparatus of claim 2, wherein said secondary gas supply means comprises an outer chamber which is positioned coaxially with the upper portion of said cylindrical passage and sealingly attached thereto, an inlet tube for applying a pressurized gas to the outer chamber from a pressure source, at least one injecting tube attached through the wall of said cylindrical portion in said outer chamber tangentially along the wall and counter-axially to the secondary flow of the fluid through said cylindrical passage.

* * * * *